(12) United States Patent
Beasley

(10) Patent No.: US 7,967,069 B2
(45) Date of Patent: Jun. 28, 2011

(54) ACTIVE SEISMIC MONITORING OF FRACTURING OPERATIONS

(75) Inventor: Craig J. Beasley, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 183 days.

(21) Appl. No.: 12/256,285

(22) Filed: Oct. 22, 2008

(65) Prior Publication Data

US 2010/0096125 A1  Apr. 22, 2010

(51) Int. Cl.
*E21B 43/26* (2006.01)
(52) U.S. Cl. ............... 166/308.1; 166/250.1; 166/254.1
(58) Field of Classification Search .............. 166/308.1, 166/250.1, 254.1
See application file for complete search history.

(56) References Cited

U.S. PATENT DOCUMENTS

| | | | | |
|---|---|---|---|---|
| 4,280,200 A | * | 7/1981 | Silverman | 367/37 |
| 5,899,272 A | * | 5/1999 | Loree | 166/280.2 |
| 6,412,561 B1 | | 7/2002 | Brown et al. | |
| 7,134,492 B2 | * | 11/2006 | Willberg et al. | 166/250.1 |
| 2007/0204995 A1 | * | 9/2007 | Hofman et al. | 166/308.1 |
| 2008/0149329 A1 | * | 6/2008 | Cooper et al. | 166/250.01 |
| 2009/0242205 A1 | * | 10/2009 | Coste et al. | 166/308.1 |

* cited by examiner

*Primary Examiner* — Giovanna C Wright

(57) ABSTRACT

A method for managing a fracturing operation. In one implementation, the method may include positioning a seismic source and at least one seismic receiver near a hydrocarbon reservoir; pumping a fracturing fluid into a well bore of the hydrocarbon reservoir; performing a seismic survey with the seismic source and the at least one seismic receiver during the fracturing operation; and identifying locations of the fracturing fluid within subsurface formations in which the hydrocarbon reservoir is located.

22 Claims, 3 Drawing Sheets

ACTIVE SEISMIC MONITORING OF FRACTURING OPERATIONS

BACKGROUND

1. Field of the Invention

Implementations of various technologies described herein generally relate to methods and systems for hydraulic fracturing operations.

2. Description of the Related Art

The following descriptions and examples are not admitted to be prior art by virtue of their inclusion within this section.

In the recovery of hydrocarbons from subterranean formations it is common practice, particularly in formations of low permeability, to fracture the hydrocarbon-bearing formation to provide flow channels. These flow channels facilitate movement of the hydrocarbons to the well bore so that the hydrocarbons may be pumped from the well.

In such fracturing operations, a fracturing fluid is hydraulically injected into a well bore penetrating the subterranean formation and is forced against the formation strata by pressure. The formation strata or rock is forced to crack and fracture, and a proppant is placed in the fracture by movement of a viscous-fluid containing proppant into the crack in the rock. The resulting fracture, with proppant in place, provides improved flow of the recoverable fluid, i.e., oil, gas or water, into the well bore.

Fracturing fluids customarily comprise a thickened or gelled aqueous solution which has suspended therein "proppant" particles that are substantially insoluble in the fluids of the formation. Proppant particles carried by the fracturing fluid remain in the fracture created, thus propping open the fracture when the fracturing pressure is released and the well is put into production. Suitable proppant materials include sand, walnut shells, sintered bauxite, or similar materials. The "propped" fracture provides a larger flow channel to the well bore through which an increased quantity of hydrocarbons can flow, thereby increasing the production rate of a well.

A problem common to many hydraulic fracturing operations is the loss of fracturing fluid into the porous matrix of the formation. Fracturing fluid loss is a major problem. Hundreds of thousands (or even millions) of gallons of fracturing fluid must be pumped down the well bore to fracture such wells, and pumping such large quantities of fluid is very costly. The lost fluid also causes problems with the fracturing operation. For example, the undesirable loss of fluid into the formation limits the fracture size and geometry which can be created during the hydraulic fracturing pressure pumping operation. Thus, the total volume of the fracture, or crack, is limited by the lost fluid volume that is lost into the rock, because such lost fluid is unavailable to apply volume and pressure to the rock face.

SUMMARY

Described herein are implementations of various technologies for a method for managing a fracturing operation. In one implementation, the method may include positioning a seismic source and at least one seismic receiver near a hydrocarbon reservoir; pumping a fracturing fluid into a well bore of the hydrocarbon reservoir; performing a seismic survey with the seismic source and the at least one seismic receiver during the fracturing operation; and identifying locations of the fracturing fluid within subsurface formations in which the hydrocarbon reservoir is located.

In another implementation, the method may include positioning a seismic source and an array of seismic receivers above a hydrocarbon reservoir; performing the fracturing operation; performing a seismic survey with the seismic source and the array of seismic receivers during the fracturing operation; generating an image of the hydrocarbon reservoir; and identifying one or more fractures on the image, wherein the fractures are disposed inside a formation of the hydrocarbon reservoir.

Described herein are also implementations of various technologies for a system for managing a fracturing operation. In one implementation, the system may include a seismic source for generating acoustic signals into a hydrocarbon reservoir; an array of seismic receivers for receiving seismic data reflected from the hydrocarbon reservoir; a pumping mechanism for pumping fracturing fluid into a wellbore of a hydrocarbon reservoir; a computer for processing the seismic data and generating an image of the hydrocarbon reservoir that includes the fracturing fluid.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraph provides a brief summary of various techniques described herein. In general, various techniques described herein are directed to determining the location of fractures and fracturing fluid in formations surrounding a hydrocarbon reservoir. Rather than passively monitoring for fractures created by the fracturing operation, active seismic monitoring of fracturing operation may be used to provide stronger signaling for fracture detection. Further, pumping fracturing fluid with a high acoustic impedance contrast to the surrounding subsurface formations may increase the visibility of the fracturing fluid on the seismic survey. In one implementation, the fracturing fluid may contain an additive that provides the high acoustic impedance contrast. One or more implementations of various techniques for determining the location of fractures and fracturing fluid in formations surrounding a hydrocarbon reservoir will now be described in more detail with reference to FIGS. 1-3 in the following paragraphs.

Figure 1:
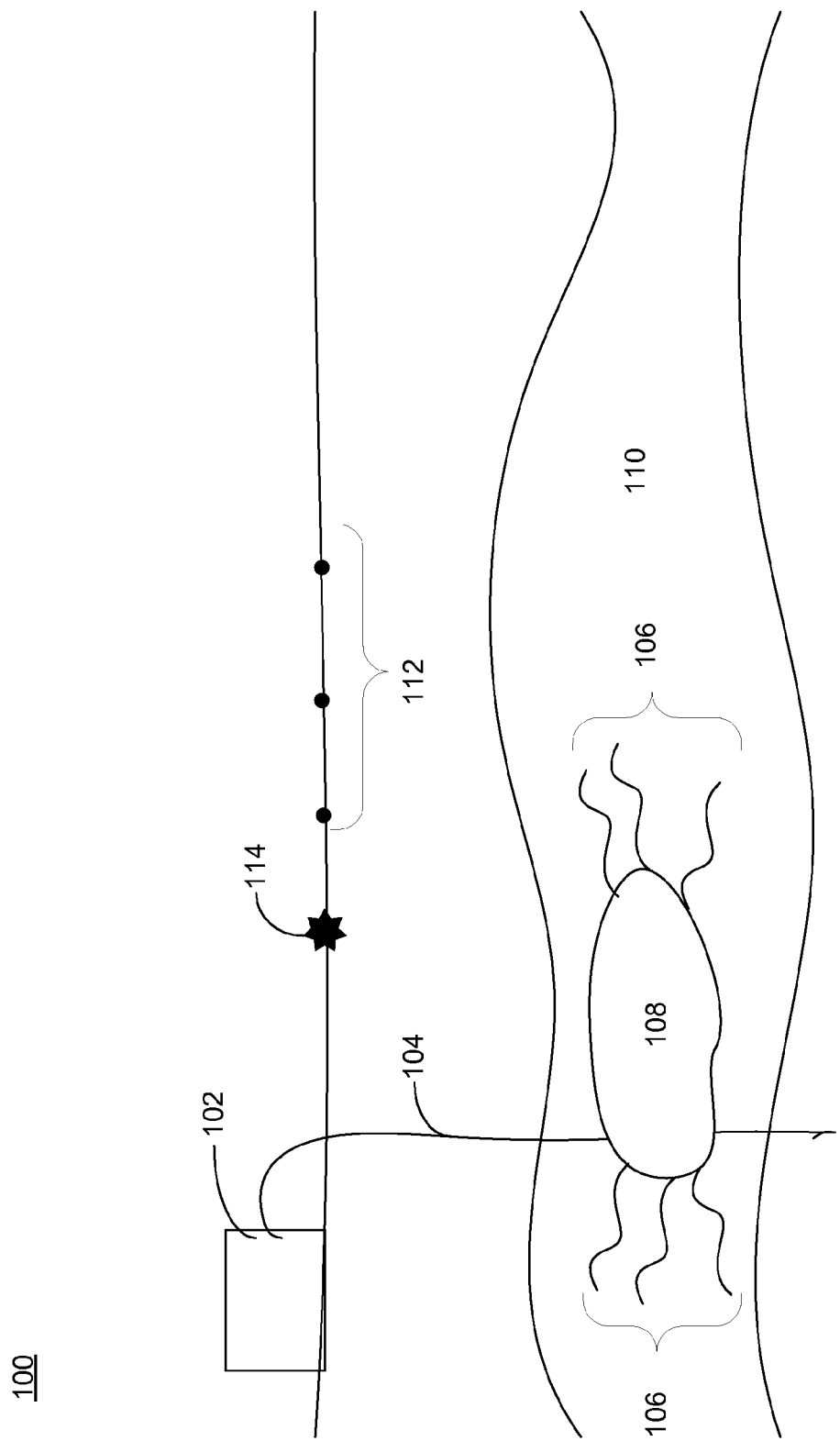
FIG. 1 illustrates a system for monitoring a hydraulic fracturing operation, in accordance with one or more implementations of various techniques described herein.

FIG. 1 illustrates a system 100 for monitoring a hydraulic fracturing operation in accordance with one or more implementations of various techniques described herein. The hydraulic fracturing operation may be also referred to herein as the fracturing operation. In the system 100, the fracturing operation may be conducted in concert with an active seismic survey in order to improve the effectiveness of the fracturing operation. The system 100 may include a pumping mechanism 102, a well bore 104, a hydrocarbon reservoir 108, a seismic array 112, and a seismic source 114.

In performing the fracturing operation, the pumping mechanism 102 may pump a fracturing fluid into the well bore 104 of the hydrocarbon reservoir 108. The hydrocarbon reservoir 108 may be disposed within a subsurface formation 110, such as a sandstone, carbonate, or chalk formation. The pressure resulting from the pumping of fracturing fluid may create fractures 106 in the formation 110. The fractures 106 may improve the flow of hydrocarbons to the well bore 104.

In a typical fracturing operation, the well bore 104 may be perforated such that the fracturing fluid enters the hydrocarbon reservoir 108 at a specified location. The location of the perforations may influence where the fractures 106 are induced in the formation.

The seismic array 112 may be a standard seismic receiver array used in seismic surveying, and may include geophones, receivers, or other seismic sensing equipment. The seismic array 112 may be positioned on the surface or in a borehole. The seismic source 114 may be a standard seismic source used in seismic surveying, such as a vibroseis, or dynamite. Like the seismic array 112, the seismic source 114 may be located on the surface or in a borehole. The seismic source 114 and seismic array 112 may be used to perform a seismic survey during the fracturing operation.

In one implementation, the seismic survey may be used to improve the effectiveness of the fracturing operation. For example, by performing a seismic survey during the fracturing operation, it may be possible to identify where in the formation 110 the fractures 106 are induced.

Sometimes, the fractures 106 that are induced by the fracturing operation may be disposed such that the fractures 106 do not improve the flow of hydrocarbons to the well bore 104. In such a scenario, the perforations in the well bore 104 may be plugged. The well bore 104 may then be re-perforated to change the location within the hydrocarbon reservoir 108 where the fracturing fluid enters. After re-perforating the well bore 104, the fracturing operation may resume.

Figure 2:
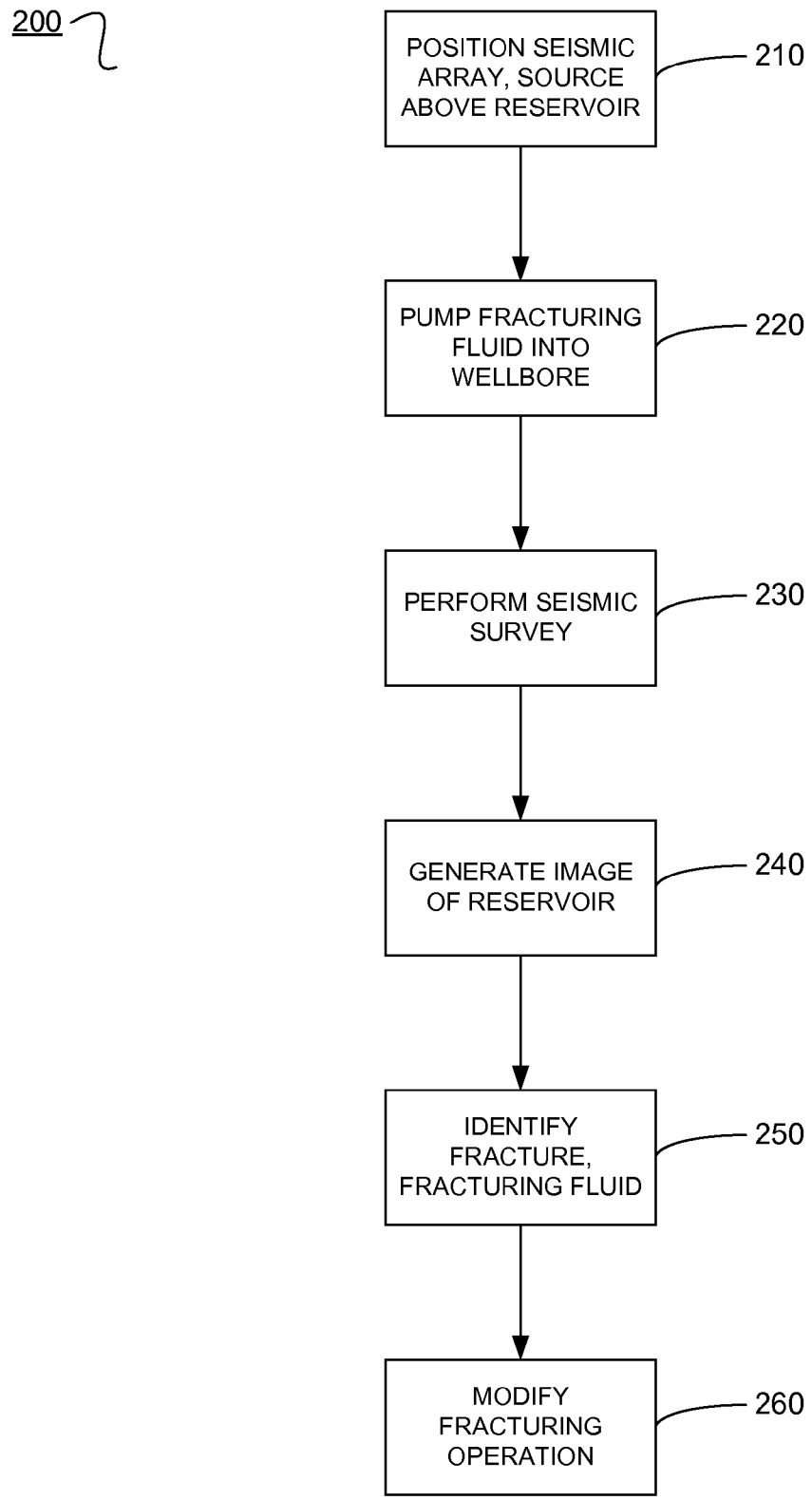
FIG. 2 illustrates a flowchart of a method for managing hydraulic fracturing operations, according to implementations described herein.

FIG. 2 illustrates a flow chart of a method 200 for managing a fracturing operation according to implementations described herein. It should be understood that while method 200 indicates a particular order of execution of the operations, in some implementations, certain portions of the operations might be executed in a different order.

At step 210, the seismic array 112 and the seismic source 114 may be positioned above the hydrocarbon reservoir 108. Surface or subsurface referenced systems may be positioned to record reflections and refractions from the fracturing fluid and the fractures that contain the fracturing fluid. This positioning can be determined through well known techniques involving seismic modeling methods, such as ray tracing or full wavefield propagation. The seismic source 114 and receivers 112 may include devices for generating and recording pressure waves, shear waves or any combinations thereof and may encompass cabled, wireless, autonomous systems or combinations thereof.

A typical fracturing operation passively listens for acoustic signals that result from the creation of the fractures 106 induced by the fracturing operation. Because these acoustic signals may be weak, a vertical seismic profile (VSP) may be created. The VSP may be used to improve the reliability of the seismic data collected.

To create a VSP, a secondary well bore may be dug as an observational well. Seismic receivers may then be positioned in the observational well in addition to the surface receivers in the seismic array 112. The acoustic signals recorded by the receivers in the observational well may then be correlated with the signals recorded at the surface.

Advantageously, using method 200, it is not necessary to dig an observational well because the seismic source 114 is used to actively survey for fractures during the fracturing operation. The seismic source 114 may provide a stronger signal than the signals generated in creating the fractures, such as acoustic signals generated by the breaking of rocks.

At step 220, the pumping mechanism 102 may pump fracturing fluid into the well bore of the hydrocarbon reservoir 108. As stated previously, pumping the fracturing fluid into the well bore 104 may induce fracturing of the formation 110 of the hydrocarbon reservoir 108.

At step 230, the seismic source 114 and the seismic array 112 may be used to perform the seismic survey. The pumping mechanism 102 may produce acoustic signals that introduce noise into the seismic survey. As such, the fracturing operation may be coordinated with the seismic survey such that the pumping mechanism 102 is halted while the seismic survey is being performed.

In one implementation, the acoustic signals produced by the pumping mechanism 102 may be used as an additional seismic source for the seismic survey. In another implementation, the pumping mechanism 102 may be used as the seismic source 114.

In another implementation, a baseline seismic survey may be performed before the fracturing operation. The baseline seismic survey may then be compared to the seismic survey performed during the fracturing operation to determine changes in amplitude, structural deformation and changes in rock properties, such as formation pressure, and to relate these changes to fracture fluid movement and fracture locations.

At step 240, an image of the hydrocarbon reservoir 108 may be generated. The receivers of the seismic array 112 may record acoustic signals from the seismic source 114 during the seismic survey. Using the recorded acoustic signals, a computing system (not shown) may generate an image of the hydrocarbon reservoir 108. In the implementation where the baseline seismic survey is performed, an image may also be generated from the acoustic signals recorded during the baseline seismic survey.

At step 250, the fractures 106 and/or the fracturing fluid may be identified on the generated image. In the implementation that includes the baseline seismic survey, the fractures 106 and the fracturing fluid may be identified by analyzing differences between the image generated by the baseline seismic survey and the image generated by the seismic survey performed during the fracturing operation.

At step 260, the fracturing operation may be modified. The modification to the fracturing operation may be based on the identified fracturing fluid or the differences between the baseline image and the image obtained during the fracturing operation. For example, if the identified fracturing fluid is disposed within the formation 110 such that fractures are not being produced, the fracturing operation may be modified to direct the fracturing fluid towards another location in the formation 110.

In one implementation, the fracturing fluid may contain an additive that enhances the acoustic impedance contrast between the fracturing fluid and the formation 110 of the hydrocarbon reservoir 108. Depending on the signal to noise ratio achieved in the seismic survey, even small changes on the order of several percent can be detected. Giving the fracturing fluid a larger acoustic impedance contrast with the formation 110 helps to distinguish the fracturing fluid from the formation 110 in the generated image.

For example, a fracturing fluid, such as water, may not have a large acoustic impedance contrast with carbonate and chalk formations. As such, methane may be dissolved in the fracturing fluid, producing a fizz gas. Fizz gas may appear as bright spots in the generated image, thereby distinguishing the fracturing fluid from the formation 110.

Figure 3:
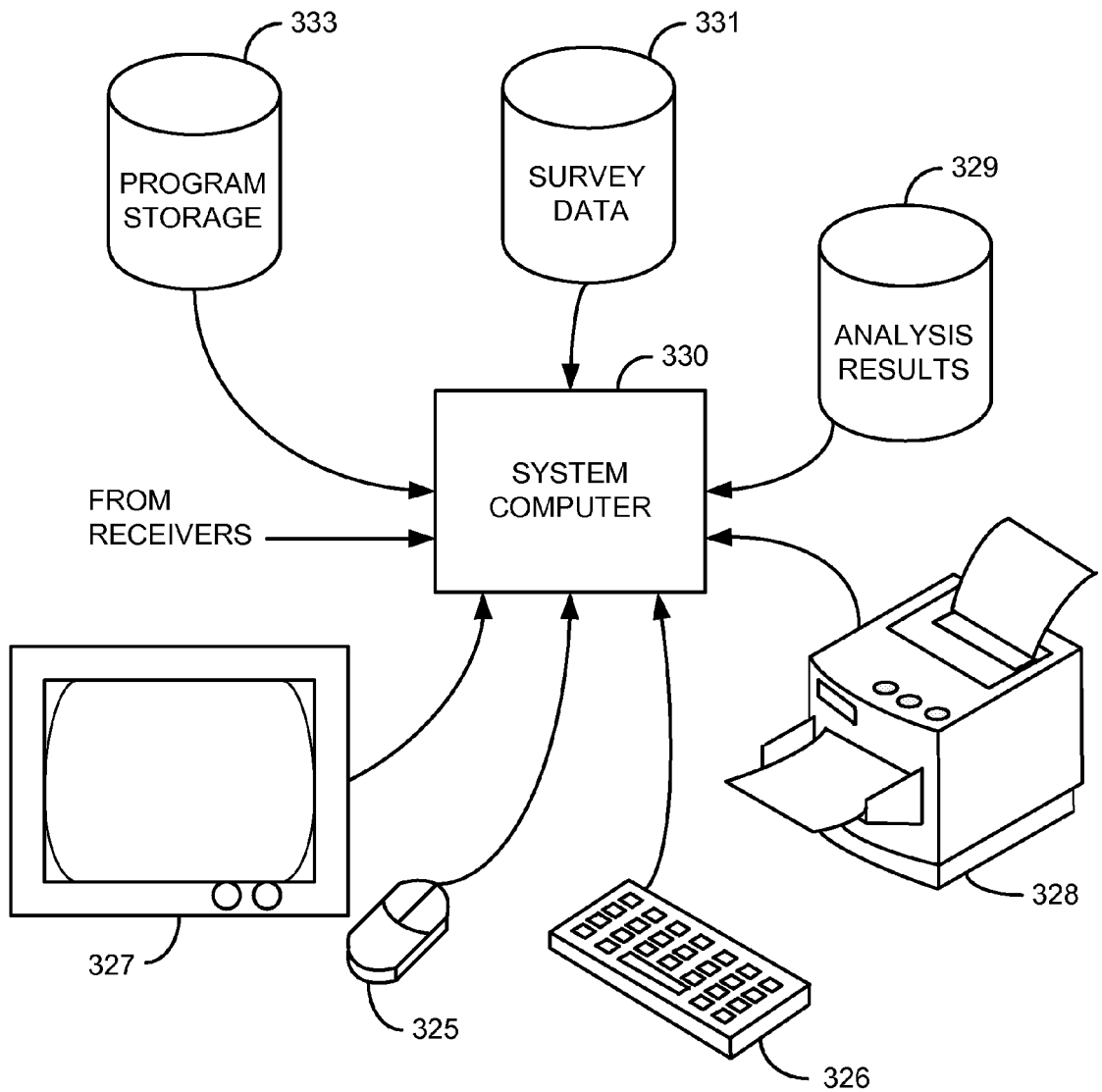
FIG. 3 illustrates a computer network, into which implementations of various technologies described herein may be implemented.

FIG. 3 illustrates a computing system 300, into which implementations of various technologies described herein may be implemented. The computing system 300 may include one or more system computers 330, which may be implemented as any conventional personal computer or server. However, those skilled in the art will appreciate that implementations of various technologies described herein may be practiced in other computer system configurations, including hypertext transfer protocol (HTTP) servers, hand-held devices, multiprocessor systems, microprocessor-based or programmable consumer electronics, network PCs, mini-computers, mainframe computers, and the like.

The system computer 330 may be in communication with disk storage devices 329, 331, and 333, which may be external hard disk storage devices. It is contemplated that disk storage devices 329, 331, and 333 are conventional hard disk drives, and as such, will be implemented by way of a local area network or by remote access. Of course, while disk storage devices 329, 331, and 333 are illustrated as separate devices, a single disk storage device may be used to store any and all of the program instructions, measurement data, and results as desired.

In one implementation, seismic data from the receivers may be stored in disk storage device 331. The system computer 330 may retrieve the appropriate data from the disk storage device 331 to process seismic data according to program instructions that correspond to implementations of various technologies described herein. The program instructions may be written in a computer programming language, such as C++, Java and the like. The program instructions may be stored in a computer-readable medium, such as program disk storage device 333. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 330.

Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 330 may present output primarily onto graphics display 327, or alternatively via printer 328. The system computer 330 may store the results of the methods described above on disk storage 329, for later use and further analysis. The keyboard 326 and the pointing device (e.g., a mouse, trackball, or the like) 325 may be provided with the system computer 330 to enable interactive operation.

The system computer 330 may be located at a data center remote from the survey region. The system computer 330 may be in communication with the receivers (either directly or via a recording unit, not shown), to receive signals indicative of the reflected seismic energy. These signals, after conventional formatting and other initial processing, may be stored by the system computer 330 as digital data in the disk storage 331 for subsequent retrieval and processing in the manner described above. While FIG. 3 illustrates the disk storage 331 as directly connected to the system computer 330, it is also contemplated that the disk storage device 331 may be accessible through a local area network or by remote access. Furthermore, while disk storage devices 329, 331 are illustrated as separate devices for storing input seismic data and analysis results, the disk storage devices 329, 331 may be implemented within a single disk drive (either together with or separately from program disk storage device 333), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for managing a fracturing operation, comprising:
    positioning a seismic source and at least one seismic receiver near a hydrocarbon reservoir, wherein the at least one seismic receiver is positioned on a surface of the Earth above the hydrocarbon reservoir, and wherein the seismic source produces pressure waves, shear waves or combinations thereof;
    performing a baseline seismic survey;
    pumping a fracturing fluid into a well bore of the hydrocarbon reservoir;
    performing a seismic survey with the seismic source and the at least one seismic receiver during the fracturing operation to generate an image of the hydrocarbon reservoir;

identifying locations of the fracturing fluid within subsurface formations in which the hydrocarbon reservoir is located;

comparing the baseline seismic survey to the seismic survey performed during the fracturing operation;

analyzing one or more differences between an image generated by the baseline seismic survey and the image generated by the seismic survey performed during the fracturing operation; and modifying the fracturing operation based on the differences.

2. The method of claim 1, further comprising modifying the fracturing operation based on the identified locations of the fracturing fluid.

3. The method of claim 1, further comprising modifying the positioning of the seismic source, the at least one seismic receiver or combinations thereof, based on the identified locations of the fracturing fluid.

4. The method of claim 1, wherein the fracturing fluid comprises an additive that enhances acoustic impedance between the fracturing fluid and the subsurface formations.

5. The method of claim 1, wherein the fracturing fluid comprises a methane gas.

6. The method of claim 1, further comprising identifying one or more fractures in the formation on the image of the hydrocarbon reservoir.

7. The method of claim 6, wherein the fractures are induced by the fracturing operation.

8. The method of claim 1, wherein the seismic source is a pumping mechanism for pumping the fracturing fluid into the well bore.

9. The method of claim 1, wherein the seismic source is a vibroseis.

10. The method of claim 1, wherein the seismic source is a dynamite.

11. The method of claim 1, wherein the pumping of the fracturing fluid is halted while performing the seismic survey.

12. A method for managing a fracturing operation, comprising:

positioning a seismic source and an array of seismic receivers above a hydrocarbon reservoir, wherein the seismic source produces pressure waves, shear waves or combinations thereof and the seismic source is a pumping mechanism for pumping fracturing fluid into a well bore of the hydrocarbon reservoir;

performing the fracturing operation;

performing a seismic survey with the seismic source and the array of seismic receivers during the fracturing operation;

generating an image of the hydrocarbon reservoir; and identifying one or more fractures on the image, wherein the fractures are disposed inside a formation of the hydrocarbon reservoir.

13. The method of claim 12, wherein the fractures are induced by the fracturing operation.

14. The method of claim 12, further comprising modifying the fracturing operation based on the identified fractures.

15. The method of claim 12, wherein performing the fracturing operation comprises pumping the fracturing fluid into a well bore of the hydrocarbon reservoir.

16. The method of claim 15, wherein the fracturing fluid comprises an additive that enhances acoustic impedance contrast between the fracturing fluid and the formation of the hydrocarbon reservoir.

17. The method of claim 12, further comprising:

performing a baseline seismic survey before the fracturing operation; and comparing the baseline seismic survey to the seismic survey performed during the fracturing operation;

analyzing one or more differences between an image generated by the baseline seismic survey and the image generated by the seismic survey performed during the fracturing operation; and modifying the fracturing operation based on the differences.

18. A system for managing a fracturing operation, comprising:

a seismic source for generating acoustic signals into a hydrocarbon reservoir;

an array of seismic receivers for receiving seismic data reflected from the hydrocarbon reservoir, wherein the array of seismic receivers are positioned on a surface of the Earth above the hydrocarbon reservoir, and wherein the seismic source produces pressure waves, shear waves or combinations thereof;

a pumping mechanism for pumping fracturing fluid into a wellbore of a hydrocarbon reservoir, wherein the pumping mechanism is the seismic source; and a computer for processing the seismic data and generating an image of the hydrocarbon reservoir that includes the fracturing fluid.

19. The system of claim 18, wherein the pumping mechanism and the array of seismic receivers are positioned near the hydrocarbon reservoir.

20. The system of claim 18, wherein the fracturing fluid comprises a methane gas.

21. A method for managing a fracturing operation, comprising:

positioning a seismic source and at least one seismic receiver near a hydrocarbon reservoir;

pumping a fracturing fluid into a well bore of the hydrocarbon reservoir;

performing a seismic survey with the seismic source and the at least one seismic receiver during the fracturing operation;

identifying locations of the fracturing fluid within subsurface formations in which the hydrocarbon reservoir is located;

performing a baseline seismic survey before the fracturing operation;

comparing the baseline seismic survey to the seismic survey performed during the fracturing operation;

analyzing one or more differences between an image generated by the baseline seismic survey and the image generated by the seismic survey performed during the fracturing operation; and modifying the fracturing operation based on the differences.

22. A method for managing a fracturing operation, comprising:

positioning a seismic source and an array of seismic receivers above a hydrocarbon reservoir;

performing the fracturing operation;

performing a seismic survey with the seismic source and the array of seismic receivers during the fracturing operation;

generating an image of the hydrocarbon reservoir;

identifying one or more fractures on the image, wherein the fractures are disposed inside a formation of the hydrocarbon reservoir;

performing a baseline seismic survey before the fracturing operation; and comparing the baseline seismic survey to the seismic survey performed during the fracturing operation;

analyzing one or more differences between an image generated by the baseline seismic survey and the image generated by the seismic survey performed during the fracturing operation; and modifying the fracturing operation based on the differences.

* * * * *